A. KALTHOFF.
LIQUID COOLING AND DISPENSING APPARATUS.
APPLICATION FILED NOV. 13, 1912.
1,098,323.
Patented May 26, 1914.
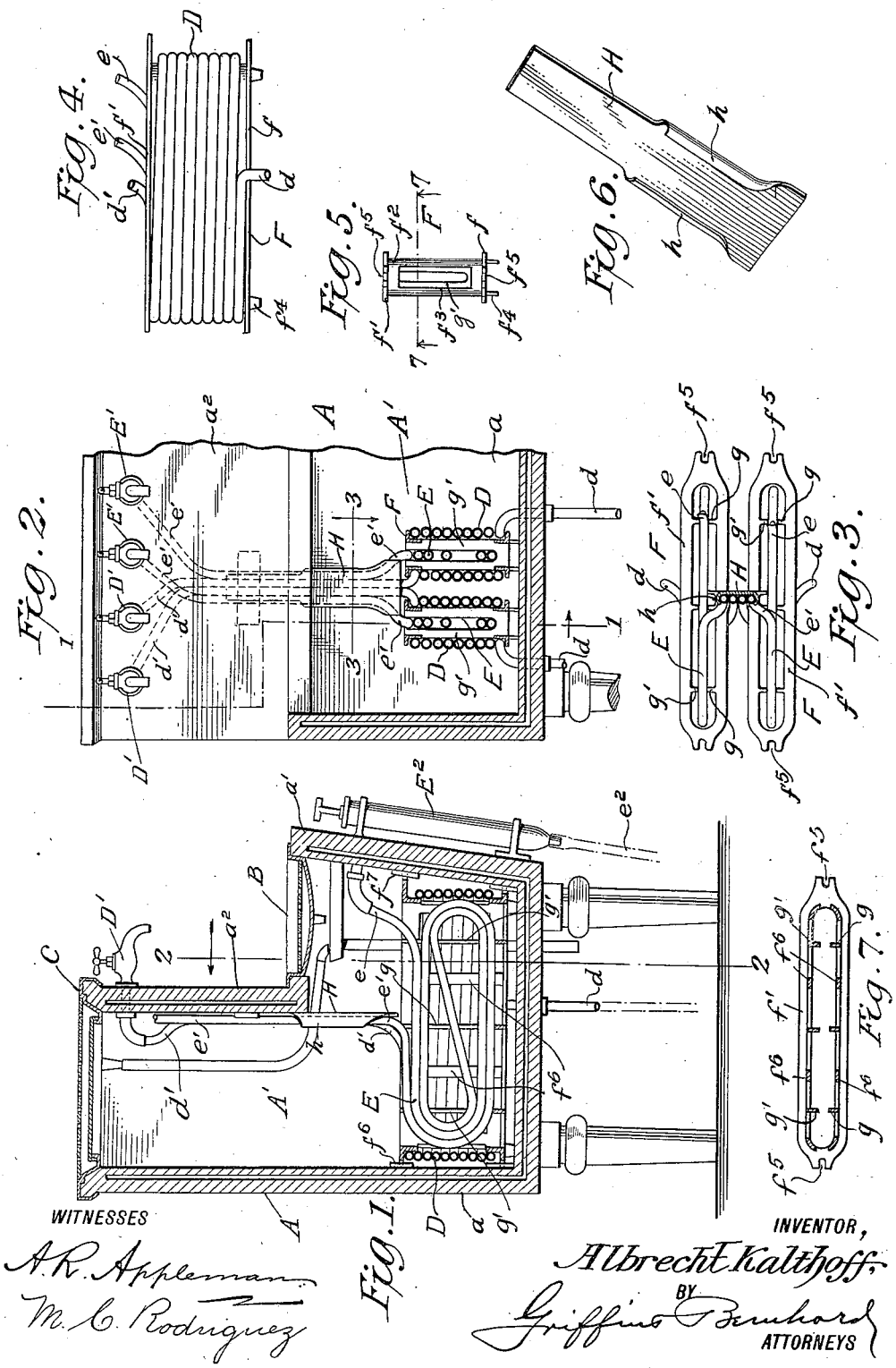

UNITED STATES PATENT OFFICE.

ALBRECHT KALTHOFF, OF NEW YORK, N. Y., ASSIGNOR TO H. D. BERNER & WINTERBAUER COMPANY, OF NEW YORK, N. Y., A CORPORATION OF NEW YORK.

LIQUID COOLING AND DISPENSING APPARATUS.

1,098,323.  Specification of Letters Patent.  Patented May 26, 1914.

Application filed November 13, 1912. Serial No. 731,153.

*To all whom it may concern:*

Be it known that I, ALBRECHT KALTHOFF, a citizen of the United States, residing at the city of New York, borough of Manhattan, county and State of New York, have invented a certain new and useful Liquid Cooling and Dispensing Apparatus, of which the following is a specification.

This invention is a liquid cooling and dispensing apparatus, the same being adapted, more particularly, for cooling beer and ale to the required temperatures and for drawing off either liquid at will.

The apparatus of the present invention is of the same general type as the dispensing apparatus disclosed in prior Patent #1,038,595 granted to me on September 17, 1912, wherein I have disclosed a casing divided by a partition into non-communicating compartments, in one of which are positioned the beer coils, and the other containing the ale coils, whereby said beer coils are exposed to direct contact with the ice, whereas the ale coils are kept cool by ice water supplied, mainly, by the overflow from the ice compartment.

The objects of the present invention are to simplify in substantial particulars the apparatus of the prior patent by dispensing with certain parts thereof; to make provision for cooling the beer and ale so that when drawn off the beer will be at lower temperature than the ale; to arrange the beer coils and the ale coils in compact relation to the end that the beer coils will be directly exposed to contact with the ice while the ale coils will be kept cool by the ice water; and to so protect the coils that ice thrown into the apparatus will not have a tendency to injure the coils.

With these ends in view, the apparatus embodies a single chamber over which are positioned a plurality of trays, one being above the other, a plurality of beer coils extending transversely within said chamber so as to lie below the respective trays, and a plurality of ale coils, each being positioned within the space inclosed by one of said beer coils, whereby the beer coils are exposed to direct contact with ice in the chamber, and the ale coils are kept from such direct ice contact.

In the present invention the axis of generation of the beer coils is vertical, whereas the axis of generation of the ale coils is horizontal, thus enabling the ale coils to be positioned within the space inclosed by the beer coils, whereby each ale coil is substantially incased by one beer coil and the two sets of coils are disposed in very compact order.

In a preferred embodiment of the invention, each beer coil is coiled or wound around a skeleton supporting frame for retaining the convolutions of said coil in proper relation to each other, said frame being provided with means for spacing the corresponding ale coil relative to the beer coil. Furthermore, a guard or shield is employed in operative position relative to the branches which extend upwardly from the coils to the draw-off faucets, said guard being in the path of the ice as it is introduced into the chamber so as to protect the upwardly extending branches from injury.

Other features of invention, and the advantages thereof, will appear from the following detailed description.

In the accompanying drawings, I have illustrated one practical embodiment of the invention, but the construction shown therein is to be understood as illustrative, only, and not as defining the limits of the invention.

Figure 1 is a vertical transverse section through a dispensing apparatus embodying this invention, the plane of the section being indicated by the dotted line 1—1 of Fig. 2. Fig. 2 is a view, partly in front elevation and partly in vertical longitudinal section, through the apparatus, the plane of the section being indicated by the dotted line 2—2 of Fig. 1, looking in the direction of the arrow. Fig. 3 is a sectional plan view illustrating two beer coils and two ale coils, the plane of the section being indicated by the dotted line 3—3 of Fig. 2. Fig. 4 is a side elevation of the skeleton frame with a beer coil and an ale coil positioned in operative relation thereto. Fig. 5 is an end view of the skeleton frame, the coil being removed. Fig. 6 is a detail perspective view of the guard by which the upstanding lengths of the coils are protected from injury when ice is thrown into the chamber. Fig. 7 is a horizontal section through the skeleton frame on the line 7—7 of Fig. 5.

A designates a casing, the back wall $a$ of which is continuous, whereas the front wall is in two parts at $a'$ $a^2$, said two parts of the front wall being in different upright positions for the accommodation of a removable tray B. A similar tray C is placed over the top of the casing, said trays B C being in different horizontal planes, and each tray being provided with means for draining surplus liquor from the glasses or containers. As shown, the back wall, the bottom, and the two members of the front wall are hollow so as to provide dead air spaces for precluding the external air from substantially affecting the temperature of the chamber A' within the casing. This chamber A' is common to both trays B C, the chamber being characterized by a lower space which extends continuously from the back wall to the section $a'$ of the front wall, there being no partition in the lower part of said chamber A' as in the apparatus disclosed in my prior patent. The upper space of chamber A' extends vertically between the back wall and the member $a^2$ of the front wall, so that the liquid drained from tray C will fall directly into the lower part of the chamber.

D designates a beer coil and E an ale coil, the latter coil E being substantially incased by the beer coil.

F designates a skeleton frame for supporting a beer coil, within which frame and the beer coil is positioned one ale coil, the latter coil filling the space within said beer coil so as to exclude ice from entering said space bounded by the convolutions of the beer coil. The skeleton frame is, preferably, cast in a single piece, and comprises a bottom member $f$, a top member $f'$, end members $f^2$, and a series of vertical bars $f^6$, the latter connecting the top and bottom members and being positioned as shown in Fig. 7 intermediate the end members. The top member and the bottom member are each provided with a longitudinal opening or slot, as appears quite clearly from the illustration of the two top members in Fig. 3. The end members $f^2$ are not as wide as the top member or the bottom member of the frame, see Figs. 2 and 5, so that the edges of the top and bottom members extend beyond the side edges of the end members, as a result of which the beer coil, wound externally upon the frame, occupies the space between the side edge portions of the top and bottom members. The convolution at the bottom of the beer coil rests upon the bottom member $f$, whereas the top convolution of said coils is beneath the top member $f'$, said coil incasing the end members $f^2$ and the vertical bars $f^6$. Each end member $f^2$ is provided with a vertical slot $f^3$ extending lengthwise thereof, see Fig. 5, the slots in the two end members permitting the flow of water through the end portions of frame F. Said frame is provided with feet $f^4$ depending from the bottom member and operating to support the frame and the coils above the bottom of the chamber for the water to flow beneath the coils. The frame is provided at the end portions of the top and bottom members with notches $f^5$, and said frame is provided, also, with webs $g$ $g'$ extending from the respective side portions of members $f$ $f'$ inwardly of the frame, the purpose of which will presently appear.

The skeleton frame is of such length as to extend from the back wall to section $a'$ of the front wall, the length of the frame being equal substantially to the width of the chamber A' at the widest part thereof, whereby the frame and the two coils are substantially increased in length as compared with the frame and coils disclosed in the apparatus of the prior patent referred to. Said frame is retained in operative position within the lower wide compartment of the chamber by means adapted for interlocking engagement with the top and bottom members of said frame. The notches $f^5$ in the respective end portions of the top and bottom members $f'$ $f$ of the frame receive the cleats $f^7$, the latter being fixed to the inner opposing faces of the back wall and section $a'$ of the front wall, as clearly shown in Fig. 1. Manifestly, the frame when it is introduced into the chamber will be so positioned that the cleats will enter the notches in said frame F, the feet $f^4$ resting upon the bottom of the casing, whereby the frame and the coils supported therein will be retained securely in position within the chamber and will occupy a spaced relation to the walls composing said chamber. Obviously, the frame and the coils may be raised a limited distance by sliding the notched end parts relative to the cleats, thus allowing easy access to be obtained to the bottom of the chamber for the purpose of cleaning the same. Coil D is wound around the end members and between the top and bottom members of said frame, the axis of generation of said coil D being vertical. The lower convolution of the coil is substantially in contact with a flange on bottom member $f$ of the frame, whereas the upper convolution is below an overhanging flange of the top member $f'$ of said frame, whereby the coil is compactly disposed within, and is substantially protected by, the frame, although the outer surfaces of the coil on both sides thereof are exposed for direct contact with ice introduced into the chamber. Said coil D has a depending branch $d$, whereby it is connected with an apparatus, such as a beer cask, in the cellar or other place of storage; and furthermore, said beer coil is provided with an upstanding branch $d'$, the latter extending upwardly through the narrow upper part of chamber A' so that said branch $d'$ will be connected to a draw-off faucet D'.

Ale coil E has its convolutions disposed one above the other, the axis of generation of coil E being horizontal. It is thus apparent that beer coil D is generated on a vertical axis and ale coil E is generated on a horizontal axis, whereby coil E may be positioned within the space incased by coil D, thus bringing the two coils into exceedingly compact relation. Coil E is provided at one end with a branch e which is connected to a pump E², the latter having a pipe or tube connection e² with an ale cask, usually positioned in the cellar or other place of storage. From the coil E leads another branch e' extending upwardly into chamber A' and connected with a draw-off faucet E'. For the purpose of retaining ale coil E within beer coil D, the frame F is provided with inwardly extending webs g g', said webs contacting with the ale coil E for retaining said coil in proper position within, and in spaced relation to the respective sides of the frame and in spaced relation, also, to the beer coil, see Figs. 1 and 3.

An important advantage secured by placing the ale coil within the beer coil is that said ale coil is housed by the beer coil from direct contact with the ice, as a result of which the beer in coil D is cooled to a much lower temperature than the ale in coil E. Manifestly, the beer coil is exposed for direct contact with the ice, whereas the ale coil is cooled by the action of the cold water upon said coil.

I have described the construction and relation of the two coils D E with respect to each other and to the frame F, and in the drawings I have shown two beer coils and corresponding ale coils with the proper number of faucets; but, manifestly, the apparatus may be provided with any desired number of beer coils, ale coils and faucets, for the reason that the capacity of the apparatus will depend upon the number of coils employed in the construction thereof.

When ice is to be introduced into chamber A' tray B is removed to expose the lower enlarged part of said chamber. The introduction of ice may result in contact of such ice with the upstanding branches d' e' of coils D E, as a result of which these branches and the coils are liable to injury. To minimize the shock due to the impact of ice with the branches d' e' of the coils when said ice is thrown into the chamber, I have provided a guard H, the latter occupying a substantially vertical position within the chamber A'. The guard is secured firmly in position to the upper part a² of the front wall, from which wall the guard depends to a point substantially above the coils, see Figs. 1 and 2. The guard is provided at its side edges with flanges h which partly incase the upstanding branches d' e' of the coils. As shown, the guard occupies a position between the opening through which the ice is introduced and the upwardly extending branches of the coils so that any ice thrown into the chamber will strike against the guard which thus absorbs the shock and precludes injury to said branches and coils.

By reference to Fig. 1 of the drawings it is apparent that the beer coils and the ale coils are longer than the corresponding coils employed in the apparatus of the prior patent, for the reason that said coils extend practically from the front wall to the rear wall within the enlarged lower part of the chamber. While coils of increased area result from the new construction, attention is called to the fact that said coils are disposed in exceedingly compact relation to each other, for the reason that the ale coils are positioned within the beer coils.

The apparatus is simple in construction owing to the omission of certain parts from the prior structure, and it is economical to manufacture. Provision is made for easily introducing ice and protecting the coils from the impact of such ice. Again, ready access is obtainable to all parts of the interior of the apparatus for the purpose of cleaning the coils and the walls of the chamber.

Having thus fully described the invention, what I claim as new and desire to secure by Letters Patent is:

1. In a dispensing and cooling apparatus, the combination with an ice containing chamber, of a skeleton frame positioned therein, a beer coil wound externally upon said frame and adapted for direct contact with ice present in said chamber, and an independent ale coil positioned within said beer coil, the space interiorly of said beer coil being substantially filled by said ale coil to the exclusion of ice within said space, and the convolutions of said beer coil being closely positioned relative to each other so that the ale coil will be substantially incased within and by the beer coil for precluding the direct contact of ice with said ale coil.

2. In a dispensing and cooling apparatus, the combination with an ice-containing chamber, of a beer coil the axis of generation of which is vertical, said beer coil being positioned within said chamber for direct contact with ice present therein, and an independent ale coil the axis of generation of which is horizontal, said ale coil being positioned within the space inclosed by said beer coil so as to substantially fill said inclosed space to the exclusion of ice therefrom, said beer coil operating to substantially incase the ale coil and to preclude the ice present in said chamber from having contact with said ale coil.

3. In a dispensing and cooling apparatus, the combination with an ice-containing chamber, of an open skeleton frame positioned therein, a beer coil wound externally upon said frame and exposed to the direct contact of ice within said chamber, and an ale coil positioned within the space inclosed by the frame and the beer coil so as to substantially fill the same to the exclusion of ice, said ale coil being wound in a direction substantially at right angles to the winding of the beer coil, and said skeleton frame being provided with spacing members extending interiorly thereof and having contact with the ale coil for retaining the latter in spaced relation to the beer coil.

4. In a dispensing and cooling apparatus, an open skeleton frame embodying an upper member, a lower member, and intermediate members connecting the upper and lower members, said upper and lower members being provided with spacing webs which extend inwardly of said members, combined with a coil wound externally upon said frame, and a second coil wound in a different direction from the winding of the first coil, said second coil being positioned within the space inclosed by the frame and the first coil and said spacing webs of the frame being in contact with the second coil for retaining the latter in spaced relation to the first coil.

5. A dispensing and cooling apparatus embodying a casing provided with a chamber to which access is obtained through a charging opening in one wall thereof, a beer coil positioned within said chamber, an ale coil in coöperative relation to the beer coil, the height of said coils being less than the depth of the chamber at that part having the charging opening so that a space of considerable depth exists between the charging opening and the coils, said coils having branch pipes extending upwardly therefrom and across said space, and a guard positioned substantially above the coils and in coöperative relation to the branch pipes for protecting the latter from the shock due to the impact of ice when the latter is introduced into the chamber.

6. In a dispensing and cooling apparatus, the combination with a chamber, of a beer coil positioned therein, an ale coil positioned within the space inclosed by the beer coil, said coils having branches extending upwardly therefrom, and a guard fixed within the chamber above the coils and substantially incasing the branch pipes for protecting them from the shock due to the impact of ice when the latter is introduced in the chamber.

7. In a dispensing and cooling apparatus, the combination with an ice-containing chamber, of a beer coil the axis of generation of which is vertical, said beer coil being positioned within said chamber and exposed to the direct contact with ice therein, and an ale coil the axis of generation of which is horizontal, said ale coil being positioned within the space inclosed by the beer coil and operating to substantially fill said space to the exclusion of ice therefrom, the convolutions of the beer coil being closely arranged with respect to each other so that the beer coil substantially incases the ale coil and protects the latter from the direct contact of ice therewith.

In testimony whereof I have signed my name to this specification in the presence of two subscribing witnesses.

ALBRECHT KALTHOFF.

Witnesses:
WM. P. KEPHART,
JAMES T. TAYLOR.

---

Copies of this patent may be obtained for five cents each, by addressing the "Commissioner of Patents, Washington, D. C."